United States Patent [19]

Adachi

[11] Patent Number: 4,567,776

[45] Date of Patent: Feb. 4, 1986

[54] FLUID FLOWMETER OF KARMAN VORTEX DETECTING TYPE

[75] Inventor: Haruhiko Adachi, Utsunomiya, Japan

[73] Assignee: Kubota Trane Ltd., Osaka, Japan

[21] Appl. No.: 508,466

[22] Filed: Jun. 28, 1983

[30] Foreign Application Priority Data

Jun. 30, 1982 [JP] Japan .............................. 57-114397
Oct. 13, 1982 [JP] Japan .............................. 57-179461

[51] Int. Cl.⁴ .............................................. G01F 1/32
[52] U.S. Cl. .................................................. 73/861.23
[58] Field of Search ...................................... 73/861.23

[56] References Cited

FOREIGN PATENT DOCUMENTS

0119953 9/1979 Japan .............................. 73/861.23

Primary Examiner—Herbert Goldstein
Attorney, Agent, or Firm—Fleit, Jacobson, Cohn & Price

[57] ABSTRACT

Fluid flowmeter which includes a Karman vortex generator, ultrasonic transmitter and receiver apparatus and networks for detecting the Karman vortices and for detecting and controlling information of a received wave and a reference wave of the ultrasonic transmitter. The flowmeter detects an air flow volume and/or speed by Karman vortex detecting means using ultrasonic waves.

7 Claims, 9 Drawing Figures

FLUID FLOWMETER OF KARMAN VORTEX DETECTING TYPE

BACKGROUND OF THE INVENTION

This invention relates to an improvement in a fluid flowmeter, and more particularly to a fluid flowmeter using an ultrasonic transmitter and receiver apparatus and network for detecting Karman vortices generated periodically as the period of phase modulation of ultrasonic beams.

When an obstacle is placed in a fluid flow stream, Karman vortices are produced in the flow stream by the obstacle. When ultrasonic waves are transmitted through the Karman vortex, a phase difference occurs between a transmitting wave and a receiving wave. The phase difference consists of a series of phase differences A changed immediately in accordance with the period of the Karman vortices and strength thereof and the other phase differences B changed slowly in accordance with the sonic velocity in the fluid.

The phase difference is detected by a detector for phase difference using an exclusive OR circuit and a low pass filter. When the phase difference B is an integer times 180 degrees, the component of the phase difference A is not demodulated and it is necessary to control the phase difference B to a fixed value excepting $180 \times n$ degrees.

The main causes of changes in the phase difference B are, firstly, transmitting sound pressure against an input voltage of a ceramic microphone for the ultrasonic waves (hereinafter referred to as "MIC"), the phase of the output voltage against an input sound pressure, and the distance between the sound source and the receiver; secondly, sonic velocity in the fluid; and thirdly transmitting frequency. With regard to the first cause, it is difficult to control the phase difference B because the manufacture of the MIC and the structure of the detecting section is very complex. With regard to the second cause, it is impossible to control without change of flow speed, since the sonic velocity is changed by change in the temperature of the fluid which is detected. With regard to the third cause, due to the transmitting frequency, when the transmitting frequency is changed to reduce and control the phase difference B, it is difficult to detect stably the phase difference A, since the MIC has a sharp resonance point to operate itself. Namely, the width of the usable frequency for MIC is very narrow, and the variation of sensitiveness of the MIC due to the change of the frequency is large, and the received signals of both of the phase differences A and B become weak by the variation of sensitiveness, and subsequently, the signal-to-noise ratio of the phase modulation for the phase difference A of the received wave by the Karman vortex street deteriorates.

With regard to an air conditioning system and method thereof using the Karman vortex type fluid flowmeter of the present invention, conditioned air is fed to each chamber through branch ducts from an air conditioning apparatus placed at one place, when the air conditioning such as air cooling or heating is made to many chambers at the same time. In this system of air conditioning, a volume of air required at a respective terminal chamber is generally different in accordance with the condition of the disposition of respective branch air ducts or the air temperature in the respective chambers, and this difference is changed further in accordance with the condition of temperature which changes from time to time in the respective chambers.

In a conventional air conditioning apparatus of the above stated system, conditioned air volume which is fed from the air conditioning apparatus is controlled in respective chambers by opening or closing a damper which is respectively installed in each branch air duct, which is respectively connected to a main air duct, and the total volume of the conditioned air which is fed by an air blower is simultaneously generally controlled.

As the conventional air conditioning apparatus, it is known that there are some types of air conditioners to control air volume by opening or closing a damper in accordance with information obtained by a sensor, and such an air conditioner can use different kinds of sensors. On sensor has a semiconductor, a thermistor or a hotwire that generates heat, another sensor uses an electric generator of the propeller fan type for an air current in a duct, and still another sensor utilizes the difference of pressure compared between the dynamic pressure and the static pressure of an air current in a duct. The first sensor does not respond immediately to feed a required volume of air and does not have a wide range, and also the sensor needs temperature correction. In addition, the first sensor, which is of high cost, does not provide stable operation and is not able to respond sufficiently when the volume of air required is changed by a large margin. The second sensor, which utilizes an electric generator of the propeller fan type, must be inspected for maintenance of the electric generator and rotor and must be considered always in terms of its mechanical life, and therefore the second sensor is moderate in price, but its maintenance involves troublesome problems. The third sensor, which utilizes differences of pressures, needs revision of temperature and does not respond immediately to feed a required volume of air.

SUMMARY OF THE INVENTION

The present invention provides a new and more efficient fluid flowmeter, a method of controlling an air conditioning system, and a system for air conditioning. The fluid flowmeter of the present invention utilizes ultrasonic transmitter and receiver apparatus and a network for detecting Karman vortices generated periodically as the period of phase modulation of ultrasonic beams to remove the phase modulation excepting the other phase modulation of the Karman vortex in the receiving ultrasonic wave, and to maintain the average phase difference between the receiving wave and the reference wave which is to be compared with the received wave. The apparatus has a phase difference discrimination network to discriminate that the phase difference between the received wave and the reference wave is an integer times either a positive number or a negative number between 0 to 180 degrees or between 180 to 360 degrees, and the phase difference of one or both the received wave and the reference wave is controlled by an output of the discrimination network. The method of the present invention is to control the feeding of a required volume of air and immediate response to the requirement for feeding the air, and to control the volume of the air which is fed through an air duct, and/or the temperature in a chamber, in accordance with information outputted from an apparatus which measures the volume of the air or the flow speed thereof by detection of the Karman vortex that is produced in the air duct, or both of the above stated information and the other information which is outputted from a temperature sensor in a chamber.

It is one object of the present invention to overcome the above disadvantages by providing an electrical phase-delay network of one or both a reference wave (generally transmitting wave) and a received wave to control the average phase difference of both the waves in a certain value such as 90+180 n degrees, except the value of 180×n degrees.

Another object of the present invention is to provide a fluid flowmeter using an ultrasonic transmitter and receiver apparatus and a network for detecting Karman vortices generated periodically as a period of phase modulation of ultrasonic beams.

A still further object and many of the attendant advantages of the present invention will be readily appreciated as the same becomes better understood by reference to the following description when read in conjunction with the accompanying drawings.

BRIEF DESCRIPTION OF THE DRAWINGS

The accompanying drawings illustrate the preferred embodiments of the present invention.

THE DETAILED DESCRIPTION OF THE INVENTION

Figure 1:
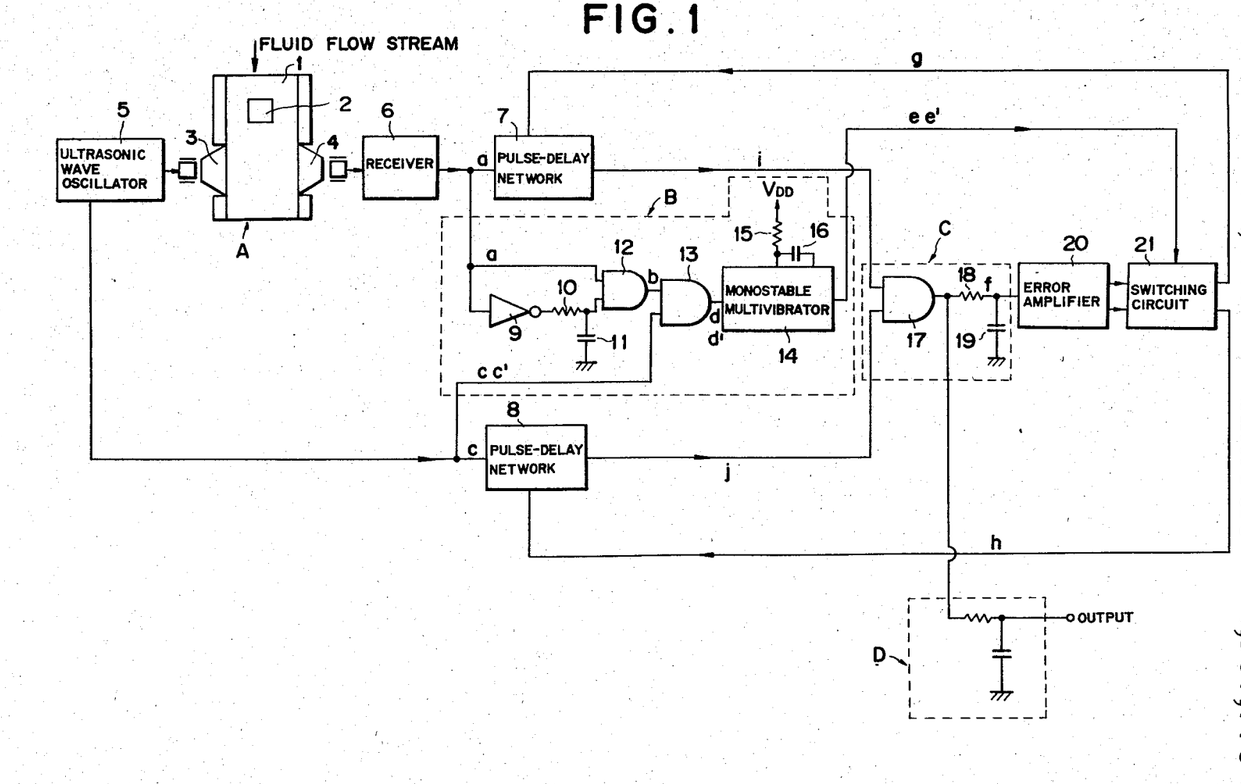
FIG. 1 is a block electrical network diagram showing a fluid flowmeter that operates by detecting a Karman vortex by means of an ultrasonic transmitter and receiver in accordance with one embodiment of the present invention.

Referring to the drawings, there is shown, according to preferred embodiments of the invention, in FIG. 1, a Karman vortex type flowmeter in general form at A, and a Karman vortex generating post 2 disposed in a pipe 1 to generate the Karman vortices. A microphone 3 (hereinafter referred to as "MIC") for a transmitter apparatus and another microphone 4 (hereinafter referred to as "MIC") for a receiver apparatus are respectively provided on the pipe 1. An ultrasonic wave oscillator 5 is connected to the MIC 3, and the MIC 4 is connected to a receiver 6 for the receiver apparatus, which is connected to a pulse-delay network 7. Another pulse-delay network 8 is connected to the ultrasonic wave oscillator 5.

A phase difference discrimination network is generally shown at B, and an inverter 9 is connected between the receiver 6 and the pulse-delay network 7. The inverter 9 is connected to an integrating network which includes an associated resistor 10 and a condenser 11. The integrating network is connected to an AND circuit 12, and is also connected between the receiver 6 and the pulse-delay network 7. The AND circuit 12 is connected to another AND circuit 13 which is connected between the ultrasonic wave oscillator 5 and a pulse-delay network 8. The AND circuit 13 is connected to a monostable multivibrator 14. The multivibrator 14 is connected to a network which includes a resistor 15 and a condenser 16 for setting time intervals of the monostable multivibrator 14 and which has an output $V_{DD}$. Condenser 16 is connected between the monostable multivibrator 14 and the resistor 15.

A phase difference detecting network is generally shown at C. An AND circuit 17, which is connected to both the pulse-delay networks 7, 8, is connected to an integrating network which includes a resistor 18 and a condenser 19.

A Karman vortex detecting filter is generally shown at D which includes a resistor and a condenser.

The network C is connected to an error amplifier 20, and the error amplifier 20 is connected to a switching circuit 21, which is also connected to the monostable multivibrator 14 of the pulse difference discrimination network B. The switching circuit 21 is connected back to both the pulse-delay networks 7 and 8 respectively.

In FIG. 1, each mark a to h, and c' to e' represents a voltage signal point at the corresponding portion of the network.

In FIG. 1, the Karman vortices are generated by the post 2 of the Karman vortex generating member, and the ultrasonic wave oscillator 5 oscillates at a fixed frequency by means of a source of electricity (not shown). The ultrasonic wave from the MIC 3 of the transmitter apparatus traverses through the Karman vortex and is received by the MIC 4 of the receiver apparatus. The received ultrasonic wave is converted into an electric signal, and the received signal is transmitted to the pulse-delay network 7 through the receiver 6. The pulse-delay network 7 inputs the pulse i, which is delayed by the received pulse a in proportion to a time influenced by the voltage g, to the AND circuit 17 of the detecting network C of the average phase difference. The output of the oscillator 5 is transmitted to the pulse-delay network 8 for the transmitter apparatus as a reference wave, and the pulse-delay network 8 inputs a pulse j, which is delayed by the reference wave pulse c in proportion to a time influenced by the voltage h, to the AND circuit 17 of the detecting network C of the average phase difference. Therefore, the pulse i and the other pulse j are received by the AND circuit 17 and are changed to a signal f through a high cut filter which includes the resistor 18 and the condenser 19.

Figure 2:
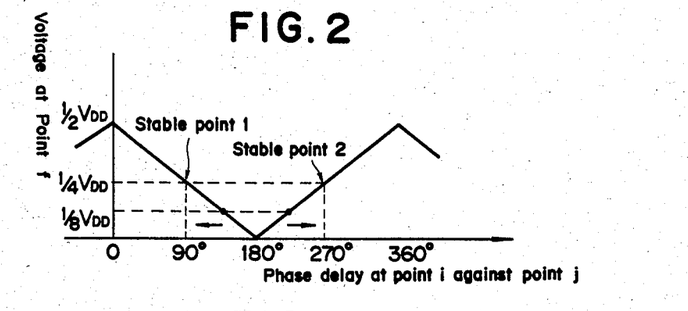
FIG. 2 is a graph showing a characteristic of the output voltage of an average phase difference detecting network included in FIG. 1.

In FIG. 2, the voltage characteristic is shown with regard to the relation between the phase delay of the pulse i against the pulse j, and the signal f.

The output of the AND circuit 17 of the detecting network C of the average phase difference is commonly used as an input to the Karman vortex detecting filter D. When the phase delay of the received pulse against the reference wave is set to a fixed value other than 180×n degrees and the average voltage f is a fixed value and, for example, is ¼ $V_{DD}$ of the phase difference of 180×n+90 degrees, it is possible to measure stably the primary phase difference excepting the other phase difference by noises. In this case, the point at which the voltage f is $\frac{1}{4}$ V$_{DD}$ exists infinitely, and variation of the voltage g or the voltage h, which is an input to the pulse-delay network 7 for the receiver apparatus or the pulse-delay network 8 for the transmitter apparatus for adjustment of the phase delay of the voltage i or the voltage j, respectively must be reversed against the direction of the variation of the error in the voltage. In FIG. 2, for example, if the voltage at f is $\frac{1}{8}$ V$_{DD}$ within the range of 0 to 180 degrees, the phase delay of the voltage i is needed relative to the voltage at j must be decreased in order to put the voltage at f at $\frac{1}{4}$ V$_{DD}$ at a stable point 1. On the other hand, if the voltage at f is $\frac{1}{8}$ V$_{DD}$ within the range of 180 to 360 degrees, the phase delay of the voltage at i relative to the voltage at j must be increased in order to place it at a stable point 2.

Therefore, the error amplifier 20 for the voltage f has two outputs which have plus and minus amplifying measures. By the error amplifier 20 and the switching circuit 21, the control of the voltage i or the voltage j is accomplished in the following manner.

Figure 3:
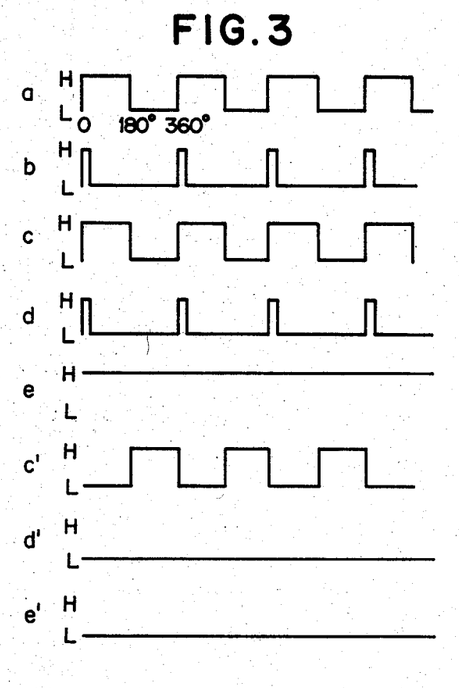
FIG. 3 is a timing diagram showing respective signal voltages at points in the network in FIG. 1.

The timing chart corresponding to each voltage point a to e, and c' to e' in FIG. 1 is shown in FIG. 3. The received wave a is inverted by the inverter 9, and is delayed by the delay network, which includes the resistor 10 and the condenser 11, and is transmitted to the AND circuit 12. The delayed signal and the received signal a are received by the AND circuit 12, and become a signal b. The signal b occurs at the time received wave a is increasing in magnitude in a positive direction. A mark c shows the reference wave. The reference wave and the above stated signal b are processed in AND circuits 12 and 13 and become a signal d. Therefore, if the received wave a is delayed 0 to 180 degrees against the reference wave, a trigger signal d occurs and is entered into the monostable multivibrator 14. At this time, the monostable multivibrator 14 outputs a pulse e of a time span which is decided by the resistor 15 and the condenser 16, and the pulse is retriggered, since the time span is a long time rather than a period of the signal d, and the output e maintains the high level position H. The time span of the output e determines the frequency of switching of the switching circuit 21 against the variation more than 180 degrees of the above-stated phase difference b. Accordingly, the voltage g is controlled and the phase of the received wave a is advanced by the pulse delay network 7, and simultaneously the phase of the reference wave c is delayed by the pulse-delay network 8.

On the other hand, when an input of the AND circuit 13 exists as shown by mark c', that is, the received wave a is delayed 180 to 360 degrees against the reference wave, the signal d is changed to the signal d' against the signal d, and the output e from the monostable multivibrator 14 is changed to a low level output e', and therefore, phase control opposite to the above stated case results.

In this embodiment, it is possible to omit one of the pulse delay networks 7 and 8.

This embodiment has the above explained construction, and therefore, even if there are mechanical errors such as a temperature change or a distance change between both the MIC 3 and the MIC 4, it is possible to detect stably and for a long time the Karman vortices since the errors are eliminated as a result of the phase difference, and it is possible to select the most suitable transmitting frequency of the signal-to-noise ratio of the MIC and to detect it with a high degree of precision since the transmitting frequency of the MIC is fixed.

Figure 4:
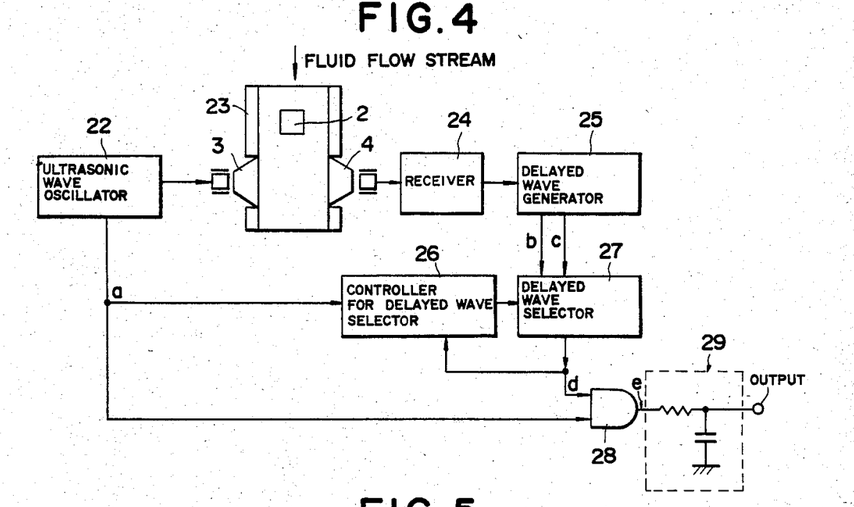
FIG. 4 is a block electrical network diagram showing a fluid flowmeter that operates by detecting a Karman vortex by means of an ultrasonic transmitter and receiver in accordance with another embodiment of the present invention.
Figure 5:
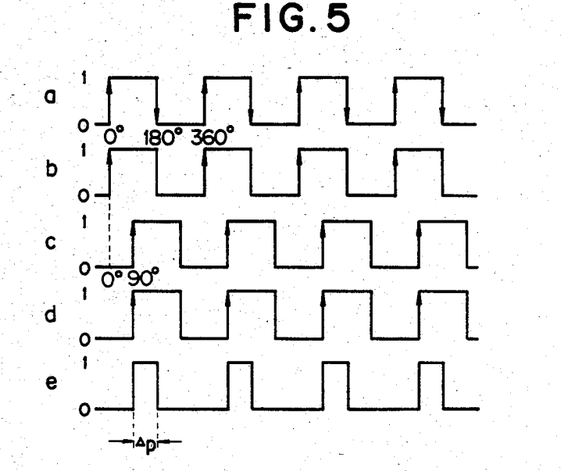
FIG. 5 is a timing diagram showing respective signals at points on the network in FIG. 4.

In FIG. 4 and FIG. 5, another embodiment of the flowmeter of the present invention is shown. FIG. 4 shows a block diagram of an electric network utilizing digital IC's through all the control system.

In FIG. 4, a Karman vortex generating post 2 is disposed in a pipe to generate the Karman vortices, and a MIC 3 for the transmitter apparatus and the other MIC 4 for a receiver apparatus are respectively provided on the pipe, and a sensing element 23 is provided adjacent both the MICS. An ultrasonic wave oscillator 22 is connected to an input of the MIC 3 and to a AND circuit 28. A receiver 24, which is connected to an output of the MIC 4, is also connected to a delayed wave generator 25. The delayed wave generator 25 is connected to a delayed wave selector network 27 by two lines. A controller 26 for delayed for delayed wave selector 27 is connected between the ultrasonic wave oscillator 22 and the AND circuit 28, and is connected to a delayed wave selector 27 which is connected to the AND circuit 28, and is also connected between the delayed wave selector 27 and the AND circuit 28. A low pass filter 29 which includes a resistor and a condenser is connected from an output of the AND circuit, and provides a Karman vortex output.

The Karman vortex generating post 2 produces the Karman vortices in the fluid flow stream, and a transmitting wave which is produced by the ultrasonic wave oscillator 22 is transmitted to the MIC 4 from the MIC 3, through the Karman vortex, and phase differences occur on the transmitting wave by the Karman vortices and other causes. A received wave at the MIC 4 is transmitted to the receiver 24. A signal which is digitized by the receiver 24 is transmitted to the delayed wave generator 25. In this embodiment, a mark b shows the received wave as it is, and the other mark c shows a delayed wave which has a phase delay of 90 degrees against the received wave shown by the mark b. Both the received wave b and the delayed wave c are inputted to the delayed wave selector 27. The delayed wave selector 27 automatically selects either the received wave b or the delayed wave c, and the selected wave is transmitted to the AND circuit 28. The controller 26 for delayed wave selector 27 supervises the signal d which is selected by the delayed wave selector 27, and a reference signal a. The controller 26 for delayed wave selector 27 has an AND circuit for rising and falling conditions of the reference signal a and for above condition of the signal d, and when the AND circuit is completed, that is, when the phase delay of the signal d and the signal a is an integer times a positive number or a negative number of 0 degrees or 180 degrees, the controller 26 for delayed wave selector 27 transmits a signal to the delayed wave selector 27, and the delay wave selector 27 changes the signal which is transmitted to the AND circuit 28 rather than the signals b or c, which was transmitted by the time. In other words, the controller 26 for delayed wave selector 27 controls the phase to select one of the signals b and c and to transmit the signal to the AND circuit 28 so as not to have a width of 0 degrees or 180 degrees on the level 1 of a signal e as shown in FIG. 5, which is processed from the signals d and a by the AND circuit 28. The signal e is transmitted to the low pass filter 29 to lead to the output.

When the change of width p of the level 1 in the signal e by the Karman vortex is within the range of over 0 degrees and less than 90 degrees, the Karman vortex is detected by the above explained control.

Figure 6:
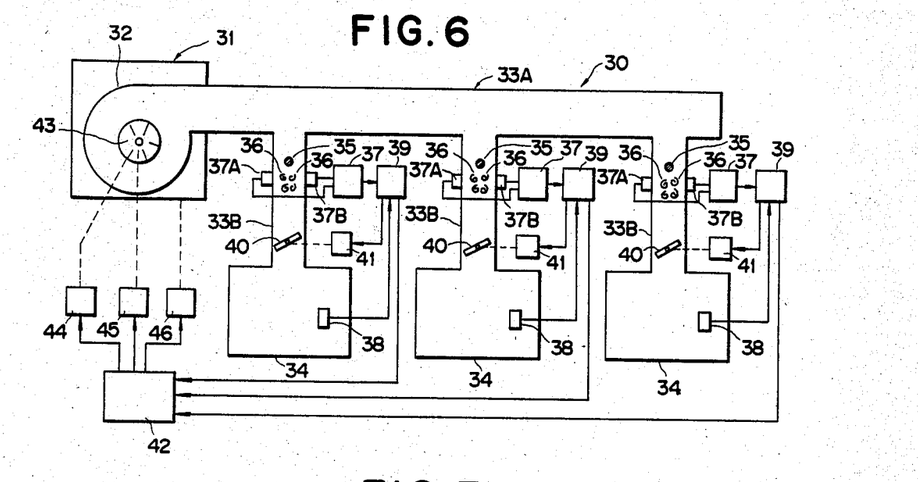
FIG. 6 is a block diagram showing an air conditioning system in accordance with an embodiment of the present invention.
Figure 7:
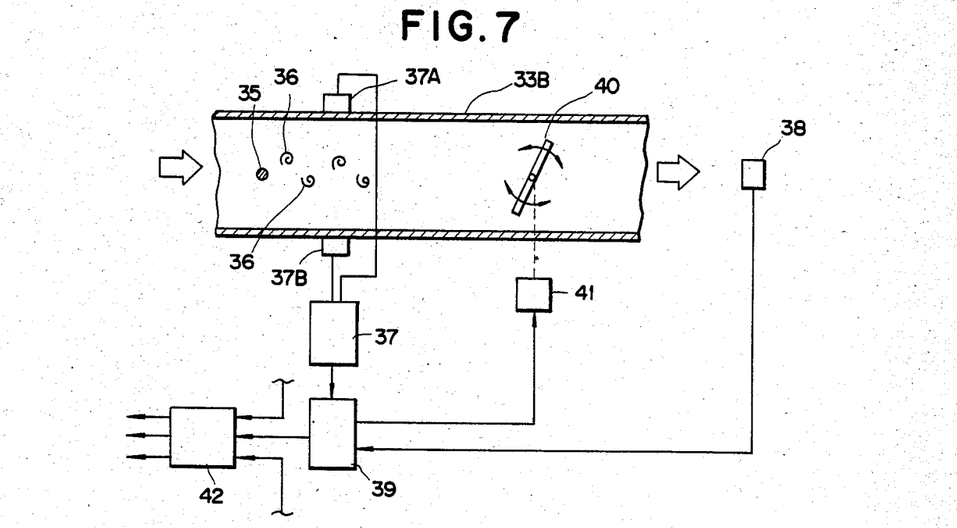
FIG. 7 is a schematic and partial sectional view of a Karman vortex generating and detecting system applied to an air duct.

In FIG. 6, an embodiment of an air conditioning system of the present invention is shown. The air conditioning system 30 is constructed to feed conditioned air to the respective chambers 34 from an air conditioning apparatus 31, which has an air blower for blowing air through a main air duct 33A and respective branch air ducts 33B which are connected with the main air duct 33A. In each branch air duct 33B, a Karman vortex generating member 35 such as a post or an obstacle which has a column of rectangular shape is disposed to produce the Karman vortices 36. The Karman vortex 36 is detected by an ultrasonic transmitting apparatus 37A and an ultrasonic receiving apparatus 37B.

Both the transmitting apparatus 37A and the receiving apparatus 37B are connected to a measuring apparatus 37 that measures the fluid flow volume or flow speed, and the measuring apparatus 37 is connected to a control apparatus 39. The control apparatus 39 receives input information from the measuring apparatus 37 and other information from a temperature sensor 38 which is disposed in the chamber 34. The control apparatus 39 is constructed to control a driving motor 41 for a damper to open or close the branch air duct, and to input the information obtained by the measuring apparatus 37 of the fluid flow volume or flow speed and by the temperature sensor 38 to a control apparatus 42 of the air conditioning apparatus 31. The control apparatus 42 is constructed to control a driving motor 44 to open and close an inlet vane 43 of the air blower 32, a driving motor 45, a driving motor 46 of a fluid flow control valve, and other means of the air conditioning apparatus 31. Namely, the control apparatus 39 is connected to the driving motor 41 which is controlled by the control apparatus 39 to drive the damper 40 which is provided in the branch duct 33B. The control apparatus 39 is connected to the control apparatus 42 for controlling the respective driving motors 44, 45 and 46. The driving motor 44 drives the inlet vane 43, the driving motor 45 drives the air blower 32, and the driving motor 46 drives a fluid flow control valve for the thermal medium.

The operation of the air conditioning system of the present invention will now be explained. General causes of a temperature change in the chamber are firstly a change of load in the chamber, secondly a temperature change of the conditioned and fed air, and thirdly a change of volume of the fed air, which is a change of the pressure. The third change of the air volume is detected by the measuring apparatus 37 and is inputted to the control apparatus 39 as information of the air volume or the air flowing speed. The first and second changes are detected as a temperature change by the temperature sensor 38 which is provided in the chamber, and information, for example the difference between a set temperature and an actual temperature in the chamber, obtained by the temperature sensor 38 is inputted to the control apparatus 39. An output for control is transmitted from the control apparatus 39 to the driving motor 41 for the damper 40 to provide a required air volume in accordance with the two inputs which are always inputted to the control apparatus 39, and the operation of controlling the air is applied to the respective chambers which are provided at the end of the respective branch air ducts. Therefore, the system is controlled to feed stably and immediately the required air volume in accordance with any change of the air volume influenced by the operation of the opening or closing of the branch air duct 33B.

The respective control apparatus 39 for each branch transmits an output for control to the other control apparatus 42. The control apparatus 42 transmits respectively an output to the driving motor 44 to open and close the inlet vane 43 of the air blower, to the driving motor 45 for the air blower 32, and the driving motor 46 of the fluid flow control valve, which is not shown in thedrawings, in accordace with the information outputted from the control apparatus 39. Therefore, the temperature of the air which is conditioned is regulated and controlled by controlling the feeding air volume to the main air duct 33A in accordance with regulation and control of the suction flow volume of the thermal medium.

By the control through the above explained system, the temperature in the chamber is maintained at a predetermined temperature, and the required minimum blowing air volume is maintained to feed by both the control apparatuses 39 and 42 even if the load is very small in the air blowing duct.

It is possible to use a feedback control system of the following type so that information for a total blowing air volume obtained by the flowmeter of the present invention, which is applied in the main air duct 33A of the air conditioning system of the present invention, is inputted to the control apparatus 42, and both the information from the flowmeter and the total amount of the information which is inputted by each control apparatus 39 are compared to make the feedback control.

And it is possible to omit the respective damper in the respective branch air duct. In this case, the temperature in the chamber is controlled in accordance with control of the blowing air volume within the main air duct and control of the temperature of the blowing conditioned air by the control apparatus 42 of the air conditioning apparatus.

Figure 8:
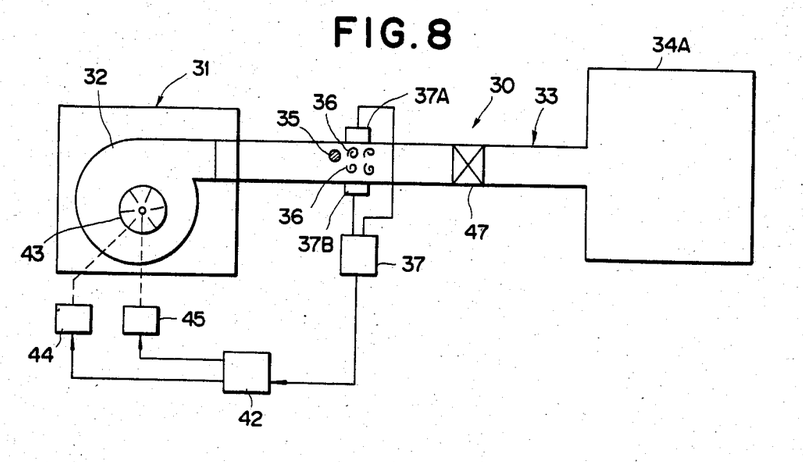
FIG. 8 is a block diagram showing an air conditioning system incorporating an embodiment of the present invention.

In FIG. 8, another embodiment of the present invention is shown. An air conditioning system A is constructed to feed air which is fed by an air blower 32 in an air conditioning apparatus 31, into a clean chamber 34A through an air duct 33. In the air duct 33, a filter 47 is provided. An obstacle 35 such as a post is disposed in the air duct 33 to produce a Karman vortex 36. The Karman vortices 26 are detected by an ultrasonic transmitting apparatus 37A and a ultrasonic receiving apparatus 37B. A measurement apparatus 37 of the fluid flow volume or the flow speed is provided, and a control apparatus 42 of the air conditioning apparatus 31, which inputs information from the measurement apparatus 37, is provided to associate with the measurement apparatus 37. The control apparatus 42 is constructed to control the number of rotations of a driving motor 44 for opening and closing an inlet vane 43 of an air blower 32 of the air conditioning apparatus 31 and/or a driving motor 45 of the air blower.

The air which is fed by the air blower 32 of the air conditioning apparatus 31 is filtered by the filter 47, and the filtered and clean air is fed to the clean chamber 34A in which a certain volume of the clean air is supplied. In this case, a loss of pressure by the filter 47 increases by choking of the filter 47. The choking of the filter 47 is one of the causes for change of the blowing air volume, but this change of the air volume is always detected by the measuring apparatus 37, and is inputted to the control apparatus 42 as information of the air volume or air blowing speed. A controlled output is transmitted to the driving motor 44 for opening and closing the inlet vane of the blower and/or the driving motor 45 of the blower to supply a sufficient volume of the air in accordance with the input information, and the volume of the feeding air is adjusted and controlled by the controlling operation of the suction volume of the air and or of the number of rotations of the blower. By this control, a certain volume of the air is supplied to the clean chamber 34A.

Figure 9:
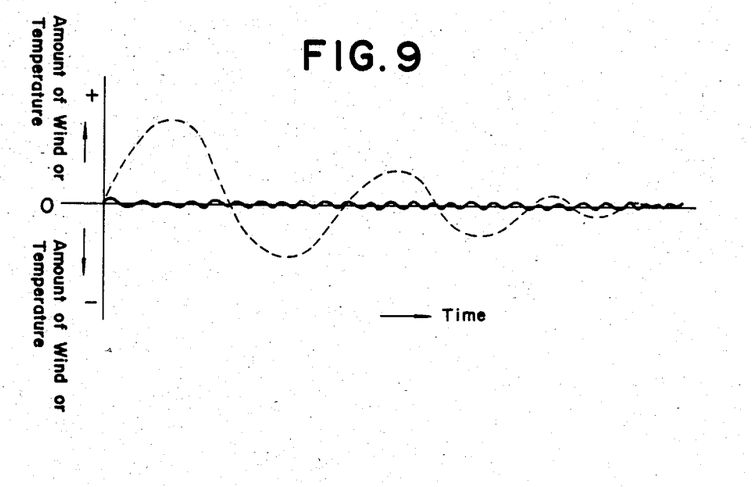
FIG. 9 is a graph showing an operating condition of the air conditioning system of the present invention.

As explained above, the air conditioning system of the present invention decides and controls the necessary volume of the conditioned air without any utilization of the pressure of the air as detecting energy when the volume of the feeding air is determined. Therefore, the potential energy of the feeding air is not lost, and the efficiency of control of the flowing air is very good, and there is not any problem in the mechanical life of the detecting apparatus. In addition, it is not necessary to correct the obtained information, such as a temperature correction, and it is easy to detect the information, since the detection of the information is dependent on the detection of the Karman vortices. Even if the blowing air system falls into disorder, for example, the damper in the duct of another chamber is broken or the filter is choked, and the volume of the blowing air is influenced by such troubles, there is not any large change of the blowing of the air or change of the amount of the air or of the temperature as shown by a dotted line in FIG. 9. When trouble occurs in the system, the first irregular wave is large, but the amount of air or wind, or temperature, is immediately revised, and the irregular waves become smaller and the change by the trouble is corrected in a short time. The wave in the solid line in FIG. 9 shows the normal condition of the system in case trouble does not exist. Therefore, the present invention has many excellent effects for maintenance of a stable temperature in the chamber and for maintenance of a certain and stable volume of the air as predetermined.

The invention may be embodied in other specific forms without departing from its spirit or essential characteristics. The described embodiment is to be considered in all respects only as illustrative and not limiting, and the scope of the invention is, therefore, indicated by the appendant claims rather than by the foregoing description. All changes which come within the meaning and range of equivalency of the claims are to be considered within their scope. Consequently, it is recognized that many variations may be made without departing from the scope or spirit of the present invention.

What is claimed is:

1. A fluid flowmeter of a Karman vortex detecting type using ultrasonic waves and eliminating components of phase modulation except those components generated by a Karman vortex and received by an ultrasonic wave receiving meas, said flowmeter comprising: means for directing ultrasonic waves through a flowing fluid, receiving means for receiving the ultrasonic waves that pass through the fluid, means for defining an average phase difference between a received wave and a reference wave to be compared therewith and for detecting the period of the Karman vortex as the phase modulation of the ultrasonic beam, a phase difference discrimination network for discriminating the phase difference between the received wave and the reference wave by detecting that an integer n in the following expression is either an even number or an uneven number: $K° = n \times 180° + x°$, wherein $K°$ is the phase difference between the reference wave and the received wave at each positive edge, n is 0 or an integer, and $x°$ is an angle of from 1 to 180 degrees, and control means connected to said means for defining an average phase difference for controlling the phase of one or both of the received wave and the reference wave by an output transmitted from the phase difference discrimination network.

2. The fluid flowmeter according to claim 1, wherein the phase difference discrimination network comprises an inverter that provides an inverter output, a first integrating network that receives the inverter output and provides a first integrated output, a first AND circuit having as one input the integrated output and as another input an amplified received wave and providing a first AND output, and a monostable multivibrator having said first AND output as the input thereto.

3. The fluid flowmeter according to claim 1, further comprising an ultrasonic wave oscillator, an ultrasonic transmitter and an ultrasonic receiver, and at least one or more pulse-delay networks, said ultrasonic wave oscillator connected to the ultrasonic transmitter and to a second AND circuit, said ultrasonic receiver connected to an inverter and to a first AND circuit, and one of said oscillator and said receiver is connected to at least one of said pulse-delay networks.

4. The fluid flowmeter according to claim 3, further comprising a detecting network for detecting a phase difference, a Karman vortex detecting filter, an error amplifier, and a switching circuit, said phase difference detecting network connected to the error amplifier, said error amplifier connected to the switching circuit and to at least one of said pulse-delay networks, and at least one of said pulse-delay networks is connected to an input of an AND circuit of the phase difference detecting network, and the monostable multivibrator is connected to the switching circuit.

5. The fluid flowmeter according to claim 4, wherein the phase difference detecting network includes an AND circuit, a resistor and a condenser, and the Karman vortex detecting filter includes a resistor and a condenser, and an output of the AND circuit of the detecting network of the phase difference is connected to the Karman vortex detecting filter.

6. A fluid flowmeter of a Karman vortex detecting type using ultrasonic waves and comprising:
 (a) an ultrasonic wave oscillator for providing an ultrasonic wave,
 (b) ultrasonic wave transmitting means coupled to said oscillator for directing ultrasonic waves through a flowing fluid,
 (c) receiving means for receiving the ultrasonic waves that pass through the fluid,
 (d) a Karman vortex generating membe for generating Karman vortices in a flowing fluid to pass between said transmitting and receiving means, and
 (e) means for eliminating components of ultrasonic wave phase modulation other than Karman vortex components from said receiving means to demodulate the components of the phase modulation by the Karman vortex, said means for eliminating phase modulation components including:
  (i) means connected to the receiving means for providing a delayed wave having a phase delay relative to the received wave,
  (ii) means connected with the ultrasonic wave oscillator to receive the reference wave for controlling the phase difference between a received wave and a reference wave for comparison with the received wave to detect a Karman vortex as a phase modulation, and (iii) means for selecting the delayed wave and connected to the means for providing a delayed wave to receive the received wave and the delayed wave, and connected to the means for controlling the phase differences to be controlled to transmit one of the selected received wave and the delayed wave so that it does not identically overlap wave edges at which increases or decreases of the reference wave and the received wave or the delayed wave occur.

7. A fluid flowmeter according to claim 6, including a delayed wave generator, a delayed wave selector, an AND circuit, and a low pass filter, said ultrasonic wave oscillator connected to the transmitter and receiver means through a Karman vortex street, and to the controller for delayed wave selector, said receiver means is connected to the delayed wave generator, the delayed wave generator is connected to the delayed wave selector by two lines, the controller for the delayed wave selector is connected to the delayed wave selector which is connected back to the controller for the delayed wave selector and to the AND circuit, and the AND circuit is connected to the low pass filter.

* * * * *